(12) United States Patent
Yun et al.

(10) Patent No.: US 12,730,820 B2
(45) Date of Patent: Sep. 8, 2026

(54) EYES-ON ANALYSIS RESULTS FOR IMPROVING SEARCH QUALITY

(71) Applicant: MICROSOFT TECHNOLOGY LICENSING, LLC, Redmond, WA (US)

(72) Inventors: Xi Yun, Redmond, WA (US); Jiantao Sun, Bellevue, WA (US); Zheng Chen, Bellevue, WA (US); Kaushik Chakrabarti, Bellevue, WA (US); Leon Melvin Romaniuk, Snohomish, WA (US); Pingjun Hu, Sammamish, WA (US); Mingyu Wang, Issaquah, WA (US); Wei Li, Bellevue, WA (US); Yaxi Li, Bellevue, WA (US); Abhilash Srivastava, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

(21) Appl. No.: 17/579,337

(22) Filed: Jan. 19, 2022

(65) Prior Publication Data

US 2023/0153310 A1 May 18, 2023

Related U.S. Application Data

(60) Provisional application No. 63/278,803, filed on Nov. 12, 2021.

(51) Int. Cl.
*G06F 16/00* (2019.01)
*G06F 16/2457* (2019.01)
(Continued)

(52) U.S. Cl.
CPC ...... *G06F 16/24578* (2019.01); *G06F 16/316* (2019.01); *G06F 16/3325* (2019.01);
(Continued)

(58) Field of Classification Search
CPC ............. G06F 16/24578; G06F 16/316; G06F 16/334; G06F 16/951; G06F 16/3325;
(Continued)

(56) References Cited

U.S. PATENT DOCUMENTS 7,627,564 B2 * 12/2009 Yao .................. G06F 16/24578 707/999.005
8,856,099 B1 * 10/2014 Lasko .................. G06F 16/951 707/706

(Continued)

FOREIGN PATENT DOCUMENTS

WO WO2012040674 A2 * 3/2012
WO WO2012058332 A1 * 5/2012
WO WO2014015174 A2 * 1/2014

OTHER PUBLICATIONS

Jufeng Yang et al., "Recognition From Web Data: A Progressive Filtering Approach", IEEE Transactions on Image Processing (vol. 27, Issue: 11, Nov. 2018), pp. 5303-5315.*

(Continued)

*Primary Examiner* — Srirama Channavajjala
(74) *Attorney, Agent, or Firm* — Workman Nydegger

(57) ABSTRACT

Systems are configured for generating and utilizing training data to train learn-to-rank type models in a manner that preserves privacy of client data used for generating the training data. The systems extract features and patterns of the user queries, search results and user interactions with the search results without tracking, storing or transmitting underlying values of the user data to preserve privacy of the user data. Systems are also configured to infer search result quality based on at least the user behavior data, and optionally query intentions, and to generate and label corresponding training data accordingly. This training data is applied to learn-to-rank type models to train the learn-to-rank type model to improve search quality of search results provided (Continued)

by the learn-to-rank type models when new user queries are processed that having features and patterns corresponding to the filtered and labelled training data.

18 Claims, 4 Drawing Sheets

(51) Int. Cl.

| | |
|---|---|
| ***G06F 16/31*** | (2019.01) |
| ***G06F 16/332*** | (2019.01) |
| ***G06F 16/334*** | (2025.01) |
| ***G06F 16/901*** | (2019.01) |
| ***G06F 16/9535*** | (2019.01) |
| ***G06N 3/08*** | (2023.01) |
| ***G06N 20/00*** | (2019.01) |
| ***G06N 20/10*** | (2019.01) |

(52) U.S. Cl.
CPC ........ *G06F 16/334* (2019.01); *G06F 16/9024* (2019.01); *G06F 16/9535* (2019.01); *G06N 3/08* (2013.01); *G06N 20/00* (2019.01); *G06N 20/10* (2019.01)

(58) Field of Classification Search
CPC ..... G06N 20/00; G06N 20/10; G06N 3/08–09
USPC .......................................................... 707/727
See application file for complete search history.

(56) References Cited

U.S. PATENT DOCUMENTS 11,170,005 B2 * 11/2021 Kota ................... G06F 16/9024
2006/0004891 A1 * 1/2006 Hurst-Hiller ....... G06F 16/3325
2010/0257167 A1 * 10/2010 Liu ......................... G06F 16/35 707/731
2012/0102018 A1 * 4/2012 Yang ................... G06F 16/3347 707/723
2012/0246100 A1 * 9/2012 Shehata ................ G06F 16/345 707/706
2013/0013591 A1 * 1/2013 Hu .......................... G06F 16/58 707/723
2015/0310073 A1 * 10/2015 Chakrabarti ........ G06F 16/2465 707/722
2016/0335263 A1 * 11/2016 Yin ................... G06F 16/24578
2016/0371541 A1 * 12/2016 Jiang ...................... G06N 20/10
2017/0262899 A1 * 9/2017 Geraghty ........... G06Q 30/0277
2018/0032890 A1 * 2/2018 Podgorny .............. G06N 20/00
2018/0239830 A1 8/2018 Dialani et al.
2018/0349513 A1 * 12/2018 Hornkvist ......... G06F 16/24578
2020/0210891 A1 * 7/2020 Safronov ............ G06F 16/3349
2021/0019309 A1 * 1/2021 Yadav ................... G06F 16/248
2021/0034657 A1 * 2/2021 Kale ...................... G06V 20/35
2022/0114417 A1 * 4/2022 Dalli ........................ G06N 3/08
2022/0308848 A1 * 9/2022 Clement .................. G06N 3/09

OTHER PUBLICATIONS

Lixin Zou et al., "Pre-trained Language Model based Ranking in Baidu Search", KDD '21: Proceedings of the 27th ACM SIGKDD Conference on Knowledge Discovery & Data Mining , Aug. 2021 pp. 4014-4022.*
"International Search Report and Written Opinion Issued in PCT Application No. PCT/US22/040678", Mailed Date: Oct. 13, 2022, 13 Pages.
Bernhardt, et al., "Microsoft / CDM", Retrieved from: https://github.com/microsoft/CDM, Dec. 16, 2021, 4 Pages.
Kumar, et al., "Types of Columns", Retrieved from: https://docs.microsoft.com/en-us/powerapps/maker/data-platform/types-of-fields, Dec. 18, 2021, 14 Pages.

* cited by examiner

EYES-ON ANALYSIS RESULTS FOR IMPROVING SEARCH QUALITY

CROSS-REFERENCE TO RELATED APPLICATIONS

This application claims the benefit of and priority to U.S. Provisional Patent Application Ser. No. 63/278,803 filed on Nov. 12, 2021, and entitled "EYES-ON ANALYSIS RESULTS FOR IMPROVING SEARCH QUALITY," which application is expressly incorporated herein by reference in its entirety.

BACKGROUND

There are many tools and platforms designed to assist with storing and accessing data in local storage, as well as in distributed and wide area networks, such as the Internet.

The Internet, for example, stores and indexes a variety of media content, including audio content, literary content, and mixed-media content, all of which can be searched and rendered with specialized browsers, media players and other specialized user interfaces. There are also various search engines and specialized applications that are configured to assist with storing and accessing data maintained in enterprise and other locally secured and private databases.

Existing search tools typically include a query field where a user can type in text comprising search terms to be used by the browser or other searching tool when searching the relevant databases for content related to the search terms.

Many existing search tools also utilize learn-to-rank type functionality, for ranking and sorting content that is identified as being potentially relevant to a user's search terms. Using this functionality, for instance, a browser or other search tool is enabled to rank and sort a plurality of possible search results according to a determined order of perceived relevance for the user, based on the user's search terms, with the most relevant search results presented first and/or at least at the top of a listing of a plurality of potentially relevant search results. Various algorithms are used to determine relative relevance of the different search results prior to presenting those results to the user.

However, even though many conventional browsers and search tools utilize learn-to-rank models in their searching functionality, many users still struggle finding content that is most relevant to the user's current needs and desires. Some of these difficulties are based on inadequate training of the search engines and models that are used to perform the search processing. In particular, while some initial training of the search engines and models has been performed, this training is not always compatible with the needs and interests of a particular user. One reason for this is because training of a model is typically based on generic and public records associated with stored documents and search query terms used by the public and search engines at large. However, this public information is not always the best information to use when training models that are used in specific and different ways by different entities.

Unfortunately, logistical constraints associated with privacy concerns often inhibits the procuring the specific and most relevant training data that could be used for training and tuning the algorithms used by the search engines and corresponding learn-to-rank models. By way of example, a private enterprise may include customers and employees that perform various types of data searching, using specific types of queries, for searching enterprise resources stored in their private databases. They may also use proprietary and/or confidential search terms on public and distributed databases. In both instances, the enterprise may not want to expose their database content and/or search query term(s) that are used to the public at large, including to public web crawlers and analytics tools that can be used to evaluate heuristics for refining the search algorithms and techniques used by the search engines.

Yet another related problem with existing learn-to-rank type models is that they are not often trained to infer a user's underlying intentions behind the search terms that are entered. Instead, they are simply focused on finding results that may include the search terms or that could somehow be determined to be relevant to the search terms (e.g., documents including synonyms, derivatives or other related terms). Such coarse processing, however, when it does not adequately capture or consider a user's intentions for entering the search term(s), may not be able to find the resources that are most relevant to the search term(s).

When a search term is a string of characters comprising a name, a phone number, an email address and/or a random term, the user who typed in the search term(s) may have different intentions behind what they are looking for. For example, when a user enters a search query, the user may only be looking for resources comprising an exact match, if one exists. This could be helpful if the user is looking for contact information associated with a particular phone number or email address, for example.

In other instances, a user may want a listing of all potentially relevant or similar results that include the search term(s), as entered, as well as results that include similar derivatives or variations of the search term(s). This can be helpful, for example, if the user misspelled a search term and/or if the search results include documents that misspell the search term.

In yet, other instances, the user may want an inclusive list of all potentially relevant documents associated with the search term(s), regardless of whether the documents include the search term(s). This can be helpful when doing research on a particular topic.

While, in other circumstances, a user may want to see only a few documents that are determined to be most relevant or a particular type of document or media format that is determined to be relevant to the search term(s).

Unfortunately, existing search tools and learn-to-rank models are not sufficiently trained or capable of inferring user intent when performing search processing.

In view of the foregoing, as well as other problems existing within the field of data management, including learn-to-rank model processing and other search engine processing, there is an ongoing need to improve the manner in which learn-to-rank type models are trained, as well as to improve the manner in which training data is procured from confidential, yet relevant data.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

New and improved methods, systems, products, and devices are provided for generating and utilizing training data to train learn-to-rank type models and for training the learn-to-rank type models to improve quality and ranking of search results generated by the learn-to-rank type models.

Disclosed embodiments are also directed to new and improved methods, systems, products, and devices for training learn-to-rank type models to infer intention from queries and to distinguish between different intention types for new and different queries based on features and patterns of the new and different queries and to correspondingly perform different actions for the different types of inferred intentions of the new and different queries to improve quality and relevance of the search results generated by the learn-to-rank type model for the new and different queries.

In some embodiments, training data is obtained and/or generated by at least utilizing eyes-on-analysis of user data and in a manner that preserves privacy of the user data.

Disclosed embodiments include and/or utilize systems configured for generating and utilizing training data to train learn-to-rank type models in a manner that preserves privacy of client data used for generating the training data. For example, disclosed systems are configured to access client data, which comprises (a) user queries provided to a learn-to-rank type model, (b) search result content that is provided as search results to the user queries that are generated by the learn-to-rank type model and (c) user behavior data comprising user interactions with the search result content. The systems are also configured to extract features and patterns of the client data, which abstractly identifies (a) features and patterns of the queries, (b) features and patterns of the search result content and (c) features and patterns of the user behavior data. This is done, in some instances, without storing, transmitting, or otherwise divulging the client data outside of a client enclave that preserves privacy of the client data, even though the abstracted features and patterns may be stored and shared externally to generate and utilize the training data to train the referenced learn-to-rank models.

The disclosed systems are also configured to infer or at least identify inferred search result quality of the referenced search result content, based on at least the user behavior data referenced above, and which can include interface click data and other interface input received when a user interacts with the search result content.

Disclosed systems are also configured to generate labelled training data for the learn-to-rank type model by labelling features and patterns of the search result content with a corresponding relevance scores based on the inferred search result quality.

To reduce or eliminate noise from conflicting labelled data, the systems are also configured to optionally filter the labelled training data by omitting or resolving conflicting relevance scores for common features and patterns of the search result content.

Finally, the disclosed systems are also configured to apply the filtered and labelled training data to learn-to-rank type models to train the learn-to-rank type model to improve search quality of search results provided by the learn-to-rank type models when new user queries are processed that having features and patterns corresponding to the filtered and labelled training data.

In some instances, the disclosed systems are further configured to identify intentions associated with different queries based on attributes and/or context of the queries. The disclosed systems are configured to utilize this additional information, for example, to supplement labelling of the training data used to train the learn-to-rank type model(s) to infer intention from queries and to distinguish between different intention types for new and different queries based on features and patterns of the new and different queries and to correspondingly perform different actions for the different types of inferred intentions of the new and different queries to improve quality and relevance of the search results generated by the learn-to-rank type model for the new and different queries.

This Summary is provided to introduce a selection of concepts in a simplified form that are further described below in the Detailed Description. This Summary is not intended to identify all the key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments include methods, systems, products, and devices for generating and utilizing training data to train learn-to-rank type models and for training the learn-to-rank type models to improve quality and ranking of search results generated by the learn-to-rank type models, as well as to infer intention from different queries and to perform different actions for different types of inferred intentions of the different queries to improve quality and relevance of the search results generated by the learn-to-rank type models when processing search queries.

In some embodiments, particularly relevant training data is obtained and/or generated by at least utilizing eyes-on-analysis of client data associated with client systems that are used to perform queries with the models that are being trained and in a manner that preserves privacy of the client data.

There are many technical benefits associated with the disclosed embodiments, including the functionality of systems including the manner in which client data privacy is preserved. The technical benefits also include facilitating training of learn-to-rank models in a manner that considers user intention for different search queries, as well as user interactions with the search result content, to improve the manner in which the models are able to identify relevant search results, while preserving privacy of the underlying user/client data.

Figure 1:
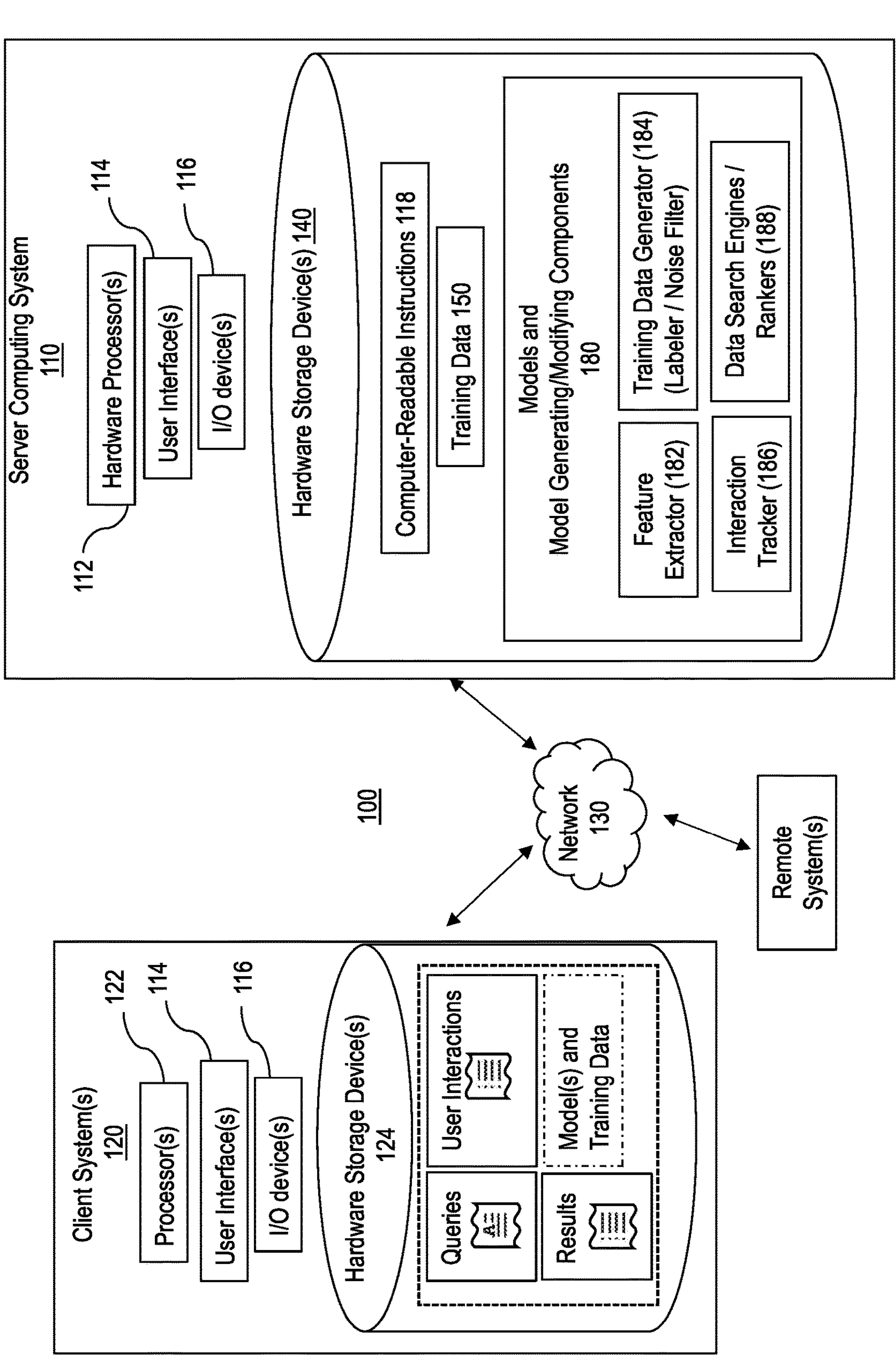
FIG. 1 illustrates a computing environment in which a computing system incorporates and/or is utilized to perform disclosed aspects of the disclosed embodiments for generating and utilizing training data for training a learn-to-rank model.

Attention will now be directed to FIG. 1, which illustrates computing systems and various components of the computing systems which may include and/or be used to implement aspects of the disclosed invention.

As shown, a first or server computing system 110 is illustrated as being incorporated within a broader computing environment 100 that also includes one or more client systems, as well as one or more remote system(s) 120 communicatively connected through one or more network connection(s) of a network 135 (e.g., the Internet, cloud, or other network connection(s)).

Each of the server computing system 110 and client system 120 include one or more processor(s) (112, 122) and one or more computer-executable instruction(s) (118) stored in corresponding hardware storage device(s) (140, 124, although only presently shown in hardware storage device(s) 140), for facilitating processing/functionality attributed to those systems and as described herein.

Although not presently shown, each of the remote system (s) 130 also comprise one or more processor(s) and one or more computer-executable instruction(s) stored in corresponding hardware storage device(s), for facilitating processing/functionality at the remote system(s), such as when the computing system 110 or client system 120 is distributed to include remote system(s) 130.

Each of the systems (110, 120, 130) also includes corresponding I/O device(s) 116 for receiving input (e.g., user queries) and for providing output (e.g., search result content). These devices 116 include keyboards, application interfaces, mouse controllers, touch pads, gesture sensors, screens, speakers, microphones, etc. The I/O device(s) 116 can also be used to access and interact with user/client data and to interface with and communicate with each of the different systems (110, 120, 130).

As further shown, system 110 stores training data 150 (which is referenced throughout) within the hardware storage devices 140. This training data 150 can include the training data in each of the different formats described (e.g., pre-labelled, post-labelled, filtered, etc.).

The system 110 also stores the various models and model generating/modifying components 180 that are used to implement the functionality described herein (e.g., browsers and search engines, algorithms, machine learning or machine learned models, etc.). In some instances, these models/components include the referenced feature extractor 182, training generator 184, interaction tracker 186 and data search engines/rankers 188, each of which will be described in more detail below.

Although not shown, the models and model generating/modifying components also include various other NLU/NLP (natural language understanding/natural language processing) components that are configured to analyze and process the different queries and results referenced herein, such as while performing runtime NLU/NLP tasks. In some instances, the NLU/NLP components are also configured to annotate different queries and/or search results to generate annotated NLU/NLP data, which is referenced below in FIGS. 2 and 3, and which can be used to further train the models for improved accuracy and performance, as well as to inform eyes-on-analysts of process changes that can be made to improve the overall system.

All of the model and training data (180, 150) can also be stored (partially or entirely) within the client system 120 and remote system(s) 130.

In some instances, the client system 120 stores specific client/user data that is confidential and that they do not want publicly shared or available for unrestricted public inspections, such as occurs with conventional browsers and web crawlers. Accordingly, the client system 120 may implement firewalls or other security mechanisms to effectively create a security or privacy enclave for their client/user data. This client/user data may include documents and resources, query log records and corresponding search result log records, as well as records of user interactions with the search results or other content maintained or accessed by the client system(s) 120. In some instances, this client/user data is maintained in private and locally maintained storage. In other instances, the storage of this content is distributed or remotely located from the client system(s) 120, while still preserving the privacy/enclave protections for the client/user data. For instance, the server computing system 110 and or the remote system(s) 130 may store the client/user data, while preventing public inspection of the data.

As mentioned earlier, some search engines are not sufficiently trained to provide search results for a client with training data that is specifically relevant to the client. One reason for this is because the client may want to keep their client data private. They may not, for example, want others to know what they are searching, what the content in the search results comprises, how they interact with the search result content, etc.

The current embodiments provide a way to preserve a level of privacy and security to the client data, while still enabling the generation of training data that can be used to train a search engine and/or corresponding learn-to-rank model to perform desired actions based on intentions behind the searches and to identify search results that are more relevant than would otherwise be obtained without the training of the model/engine with the training data generated from the client data.

To explain the foregoing, reference will now be made to FIGS. 2 and 3, which illustrate various system flows 200 that include flow process and components for generating and utilizing training data based on client data, while still preserving privacy of the client data. Each of the illustrated and referenced components (other than the eyes-on-data analyst-when human) may be stored in and incorporated into the referenced computing system(s) (110, 120 and/or 130).

Figure 2:
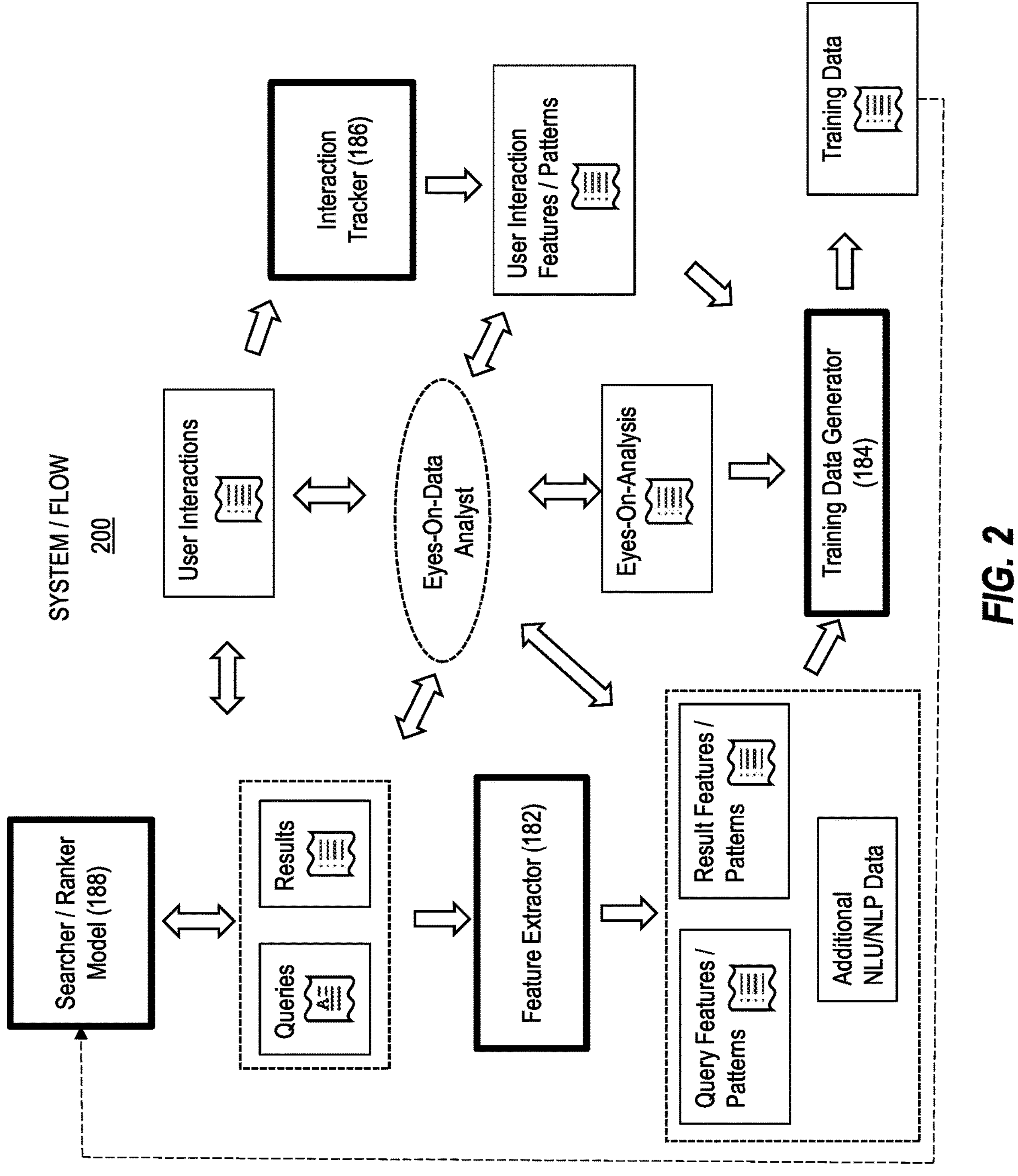
FIG. 2 illustrates an embodiment of system model components and a flow corresponding to the overall generating and utilizing of training data for training a learn-to-rank model.

As shown in FIG. 2, searcher/ranker model 188 is used to interface with user input and to receive, for example, search queries and to provide search results based on the search queries. This search query data and search result data may be confidential and may be stored in the form of log files or transaction records. In some instances, the searcher/ranker model 188 is a search engine or model that implements learn-to-rank functionality. Those of skill in the art appreciate that this functionality includes identification, ranking and sorting of content based on assigned relevance for the different content (based on corresponding search terms/queries) and which relevance may be calculated or determined according to machine learnable algorithms/models.

Using the feature extractor 182, the disclosed systems analyze the query attributes and patterns, without storing or transmitting underlying confidential data. For instance, the feature extractor 182 can identify attributes and characteristics of the query terms, without needing to track the actual value of the terms. For instance, the feature extractor 182 can identify features such as quantity of terms in a search, lengths of the terms used, types of term elements (e.g., numeric or alphabetic characters), grammatical types and formatting of terms (e.g., noun, verb, adverb, calendar elements, phone number formatting, address formatting, name formatting, phrases, etc.). Each of these attributes can be used to determine a particular attribute and pattern of a corresponding search query and without tracking actual values of the search query terms. In this manner, the features and patterns of the search queries are determined without having to know or track the underlying values of the terms used in the search queries.

The features and patterns that are identified can be based on independent and limited access by the feature extractor 182 of the underlying query data. This type of access can still preserve the privacy of the underlying data if it is not published or shared outside of the client system. Additionally, or alternatively, an agent stored on the client system 120 can access and retrieve the feature and pattern attributes for the feature extractor 181, in response to requests by the feature extractor 182, and without granting the feature extractor 182 actual access to the values of the search query terms. Either way, the client data (e.g., values of the search terms) are maintained in privacy while the feature extractor 182 is able to identify the various query features and patterns that will be used to generate the targeted and refining training data for the searcher/ranker model 188.

Similarly, the feature extractor 182 can directly or indirectly identify features and patterns of the search result content that is returned for the different queries. This can include identifying source locations for the search result content, age, author, formatting, type of content (e.g., video, image, text, structured table data, code, etc.) and any other attributes of the search result content. These feature and patterns of the search results can be identified and stored, without storing the actual values/data contained in the search results and which may be confidential or private.

Additional NLU/NLP data can also be generated by the feature extractor 182, for example, which may include annotated queries and/or results that are annotated to identify synonyms, translations, derivatives, and/or any other NLU/NLP characterizations of the query and/or result data being processed.

In some instances, an eyes-on-data analyst can also supplement the identification of the different features and patterns of the search queries and search result data. This limited access by a human search specialist/analyst can be limited to preserve privacy of the underlying data. In some instances, although not required, the specialist is an employee of the client or enterprise that is performing the search queries. The analyst will provide eyes-on-analysis reports that can be parsed and interpreted by the training data generator 184, along with the query and result features/patterns that were obtained by the feature extractor 182. In some instances, the training data generator 184 creates pairings of the query and result features/patterns with or without the eyes-on-analysis, which is also labelled according to inferred relevance, according to relevance algorithms of the training data generator 184.

The training data generator 184 also generates labels based on relevance according to and/or based on determined relevance according to analysis of the user interactions with the different search results and when making the search queries. These user interactions, for example, can be tracked and quantified by the interaction tracker 186, to determine whether a user has selected or otherwise interacted with any portion(s) of the search result content that is provided in response to the user's search queries.

The user interactions can be stored as key stroke interactions, mouse clicks or other user input attributes (e.g., location on a document where a user selected, etc.). In this manner, the interaction tracker 186 can identify features and patters associated with the user interactions and which can be helpful to assess relevance of the search result content being interacted with. These interactions can be tracked abstractly, without having to track the content and values being interacted with (which may be private or confidential). For example, if a user selects a table provided in a search result and then selects or clicks on a particular column in the table, the inference can be made that this content is relevant. It is also possible to identify features and patterns of the user interactions and potential relevance of the content being interacted with, based on the features and patterns of the user's interactions (e.g., user selected a table of a particular type of content from the search results and selected on or interacted with data in a particular column that contains data of a particular type). This inference can be drawn without tracking the actual values of the content being selected. The inferences can also be drawn by limited eyes-on-analysis of the logged interactions by an eyes-on-data analyst.

The labeling of the training data (comprising pairings of the query features/patterns and corresponding search result features/patterns and/or user interaction features/patterns) includes a score or value of perceived relevance of different search results (or search result features/patterns) for different search queries (or search query features/patterns) and based on evaluated user interactions (or user interaction features/patterns) and/or based on corresponding eyes-on-analysis. This labelling is done, therefore, while preserving confidentiality and privacy of the underlying client/user data.

In some instances, the labelled training data includes noise that results from conflicting relevance valuations for similar feature/pattern pairings. To reduce or otherwise mitigate this noise from the training data, the training data generator 184 will omit or resolve the conflicts in the valuations. The resolution of the conflict can be an averaging of the assigned relevance valuations and/or the deletion of any newly assigned relevance valuation that creates the conflict and/or the deletion of the oldest assigned relevance valuation that creates a conflict.

The relevance values assigned to the different training data sets/pairings can be any type of relative value. In some instances, the values are numerical values within a numerical scale or range (e.g., 0-5, 0-100, or another scale) or a descriptive label value (e.g., High, Medium, Low), or another type of value (e.g., binary flag to represent relevant or not relevant beyond a threshold of relevance).

Preferably, the training data includes various training data sets/pairings that reflect correspondingly high or good relevance of some search result content (having particular features/patterns), as well as correspondingly bad or low relevance for other search result content (for different features/patters), for the same or similar query types and attributes (E.g., query features and patterns). Then, the training data will be very useful for training the searcher/ranker model 188 what types of search result features/attributes are most relevant and which are not as relevant. Then, when the searcher/ranker model 188 is subsequently used to identify, rank and sort search results within the search result content provided to users for new search queries (based on the features/patterns of the new queries), the model can provide better and more relevant results than it could before the specialized training with the training data described herein. Notably, again, this is possible without necessarily exposing the underlying client/user data to public inspection.

Figure 3:
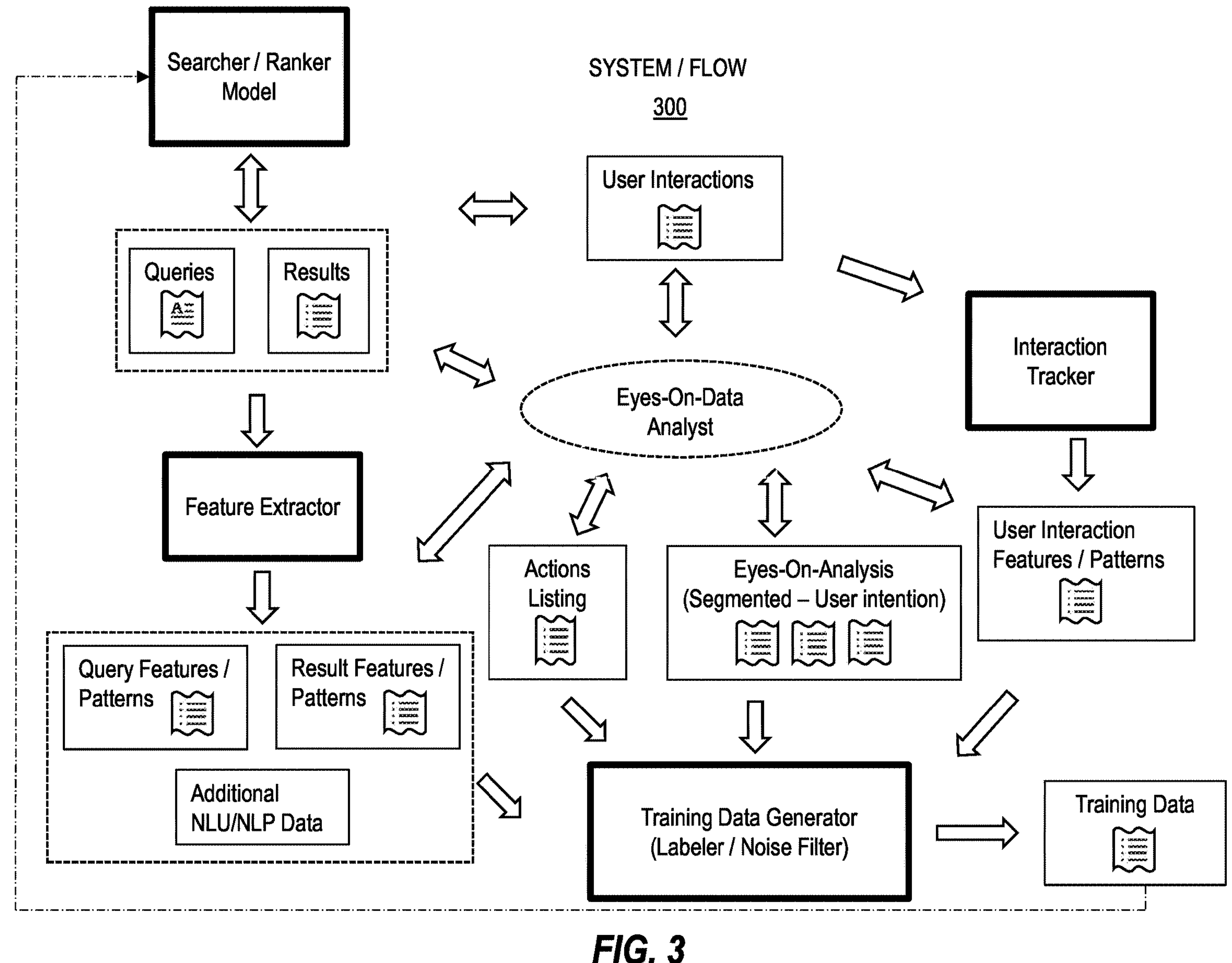
FIG. 3 illustrates another embodiment of system model components and a flow corresponding to the overall generating and utilizing of training data for training a learn-to-rank model that further includes segmenting training data.

FIG. 3 illustrates a similar system/flow 300 in which the training data generator is configured to label training data within different segmented groupings of training data. In particular, in this embodiment, an eyes-on-data analyst (human or automated system) segments the different types of queries and/or query features and patterns into different groupings for different types of queries, based on inferred intentions behind the queries and based on a set of inferred actions that are desired to be performed for the different types of queries.

By way of example, when search terms comprise strings of characters in the form of a name, a phone number, an email address and/or a phrase or combination of terms, the users who typed in the search queries may have different intentions behind what they are looking for. For example, when a user enters a search query comprising a phone number, the user may only be looking for resources comprising an exact match, if one exists. Likewise, if a user enters a phrase, the user may want a listing of all potentially relevant or similar results that include the phrase, as entered, as well as results that include similar derivatives or variations of the phrase.

This can be helpful, for example, if the user misspelled a term in the phrase and/or if the search results include documents that misspell certain terms. In yet, other instances, the user may want an inclusive list of all potentially relevant documents associated with the search term(s), regardless of whether the documents include the search term(s). This can be helpful when doing research on a particular topic. While, in other circumstances, a user may want to see only a few documents that are determined to be most relevant or a particular type of document or media format that is determined to be relevant to the search term(s).

To address this problem, the current systems are configured to generate and use training data for a model to train the model to perform different desired actions for different types of search queries, based on inferred intentions of the search queries (based on the query attributes). In some instances, based on determined query type and intention, for example, a system may be trained to identify and provide only exact matches to a query term, to identify and provide a limited set of search results, to identify and return search results with any similarity or relevance to the search term(s) and/or only to provide results that exceed a certain threshold of relevance, to provide particular types or formats of media and other content determined to be relevant to the query and/or any other set of learn-to-rank and/or other search result processing functionality.

In some instances, the system identifies different types of queries that are categorized by type (E.g., name, phone number, address, research topic, commerce, media, general, project, or any other category of search type). The segmenting and grouping of the different queries and results and/or their features/patterns into the different segmented groupings (of two or more groupings) can be performed by the feature extractor 182, by a human or automated eyes-on-data analyst, by the training data generator 184, or another system component.

The system is also configured to identify and pair different sets of actions and/or discrete actions or instructions for identifying and returning search result content of different features/patterns as training data. These training data pairings can also include specific actions to perform or to refrain from performing, according to an actions listing protocol/guideline. Then, these sets of training data are labelled with relevance labels (as previously described) to provide relative relevance and importance for performing different actions and for returning different types of search results for different types of queries.

Preferably, the training data includes different types of actions to perform for different types of queries (the types of queries being based on different inferred intentions for the queries). In some instances, the user interactions are used to assess and segment the different types of queries, including based on historical information associated with the specific user providing the queries and/or interactions with the search results (e.g., which content is selected first or at all, which types of content are selected and/or refrained from being selecting, etc.).

It will be appreciated that the foregoing techniques for generating and using training data based on inferred intentions for different search queries is an improvement over conventional learn-to-rank type models that are not trained to infer a user's underlying intentions behind the search terms that are entered.

This training data, based on inferred intention can also be filtered to reduce or mitigate noise associated with conflicts, as described above.

Whether the training data is filtered or not, the training data can be applied to the search/ranker model 188 in a training process to modify the underlying model algorithms for identifying and ranking relevance of search result content based on the features and patterns of the search result content and to perform certain actions when identify and returning one or more search results for the corresponding search queries of different types, based on the particular features and patterns of the queries that are associated with different inferred intentions.

One benefit of segmenting the different types of queries and corresponding feature/pattern sets into different groupings is that the different groupings and analysis of those groupings enables the identification of the specific groupings that are most susceptible to errors and/or improvements. This type of characterization of the different groupings, based on the eyes-on-analysis, for example, as well as based on automated analysis of the different groupings, enables the system to identify and target one or more specific group(s) out of the plurality of groupings for prioritized attention, modification and/or to use for generating training data sets to use in improving the model search functionality and NLU processing associated with the targeted group(s). In this manner, it will be possible to obtain the greatest return on investment for time spent training the model(s) and for improving the overall system and end-to-end search quality and user experiences associated with the system.

Additionally, when the system generates NLU/NLP data, such as the annotated NLU/NLP data referenced earlier in discussions of FIG. 2, it will be appreciated that this NLU/NLP data can also be used to generate labels for the referenced training data that is generated. Additionally, or alternatively, this NLU/NLP data can also be used by an eye-on-analyst to determine one or more actions to be performed for queries of corresponding query types associated with the annotated NLU/NLP data.

In view of the foregoing, it will be appreciated that the disclosed embodiments facilitate training the learn-to-rank model(s) and other NLU/NLP components with various training data sets, to accommodate different needs and preferences, and to perform desired analysis queries and search result content and to perform different actions that are determined to be relevant for the inferred intentions of the different queries and to generate search results that are determined to be relevant for the search queries, based on referenced features and patterns of user/client queries and user interactions, as described herein.

It will be appreciated that, in addition to the searcher/ranker model (which may be a learn-to-rank model or search engine), each of the other model components 180 (e.g., feature extractor 182, training data generator 184 and interaction tracker 186) are also individual models or computer-executable modules that are trained and/or configured to perform the referenced and described functionality.

Figure 4:
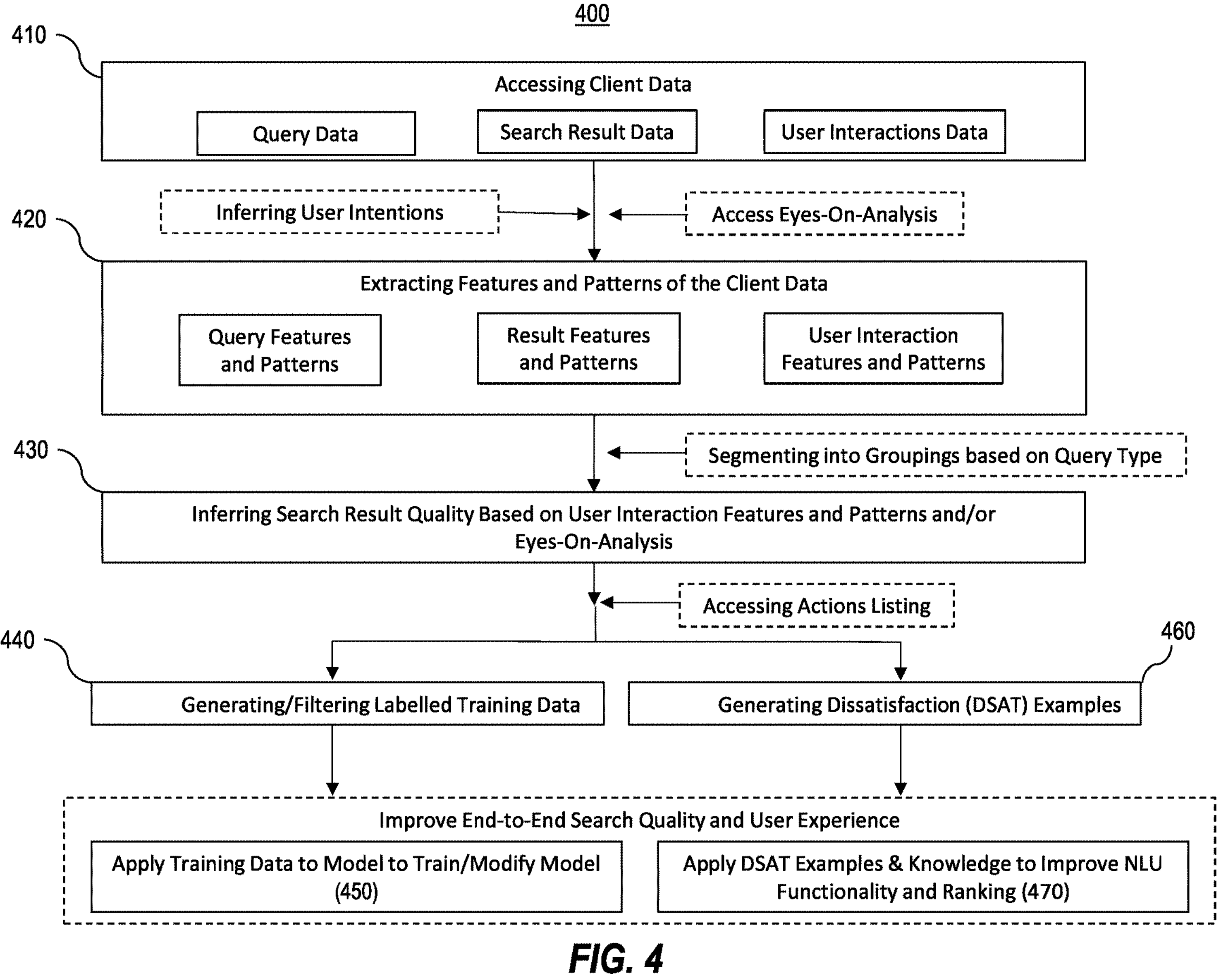
FIG. 4 illustrates one embodiment of a flow diagram having a plurality of acts associated with methods for generating and utilizing of training data for training a learn-to-rank model.

Attention will now be directed to FIG. 4, which illustrates a flow diagram 400 that includes various acts associated with exemplary methods that can be implemented by the computing system(s) referenced in FIG. 1.

As shown, the flow diagram 400 includes a plurality of acts (act 410, act 420, act 430, act 440, and act 450) which are associated with various methods for generating and/or utilizing training data to train learn-to-rank type models to identify and return relevant search result content corresponding to user queries and in a manner that preserves privacy of client data. In some instances, this also includes generating and/or utilizing training data for training learn-to-rank type models to infer intention from queries and to distinguish between different intention types for new and different queries based on features and patterns of the new and different queries and to correspondingly perform different actions for the different types of inferred intentions of the new and different queries to improve quality and relevance of the search results generated by the learn-to-rank type model for the new and different queries.

As shown, the first illustrated act (act 410) includes a system accessing client data, which comprises (a) user queries provided to a learn-to-rank type model, (b) search result content that is provided as search results to the user queries that are generated by the learn-to-rank type model and (c) user behavior data comprising user interactions with the search result content.

The system also extracts features and patterns of the client data (act 420), as described earlier, which abstractly identifies (a) features and patterns of the queries, (b) features and patterns of the search result content and (c) features and patterns of the user behavior data. This is done, in some instances, without storing, transmitting or otherwise divulging the client data outside of a client enclave that preserves privacy of the client data.

The system also infers (act 430) or identifies inferred search result quality of the search result content based on at least the user behavior data referenced above, and which can include interface click data and other interface input received when a user interacts with the search result content (e.g., user transaction logs).

In some instances, the inferred search result quality based on at the user behavior data is determined by analyzing click signals from a user system that are generated by a user interacting on the user system with the content and which are used to determine at least one of: (a) a frequency of interacting the search result content, (b) whether the user navigated to another resource that is referenced in the search result content, (c) whether the user copied or saved any of the content, (d) which one or more search results the user interacted with the most out of the different search results in the search result content, (e) which search result the user interacted with first out of the search results that are provided in the search result content, or (f) which search results the user did not interact with at all from the search result content. This may also additionally, or alternatively include determining which portions or areas of a document a user clicked on (e.g., portions of a table, a document or even portions of a screen that are displaying the content), for example, when the user is interacting with the content.

In some instances, the processes of extracting features and patterns (act 420) and/or inferring search result quality (e.g., relevance) (act 430) is also based on eyes-on-analysis provided by one or more human analysts and/or automated analyst system(s). For instance, the system may access eyes-on-analysis data that identifies analyst assessments of quality for the different search result content based on the user queries. This may further include extracting features and patterns of the client data by at least accessing eyes-on-analysis data that identifies the features and patterns of the queries and the features and patterns of the search result content.

Another illustrated act includes generating labelled training data for the learn-to-rank type model by labelling features and patterns of the search result content with a corresponding relevance scores based on the inferred search result quality (act 440).

To reduce or eliminate noise from conflicting labelled data, the system also, optionally, filters the labelled training data by omitting or resolving conflicting relevance scores for common features and patterns of the search result content.

In some instances, the system further identifies intentions associated with different queries. The disclosed systems are configured to utilize this information to supplement labelling of the training data used to train the learn-to-rank type model(s) to infer intention from queries and to distinguish between different intention types for new and different queries based on features and patterns of the new and different queries and to correspondingly perform different actions for the different types of inferred intentions of the new and different queries to improve quality and relevance of the search results generated by the learn-to-rank type model for the new and different queries.

The process of extracting features and patterns of the client data may include inferring user intentions of the queries, which are based on the features and patterns of the client data (e.g., queries). Alternatively, the inferred user intentions for the queries may be obtained from the eyes-on-analysis.

Either way, when inferred intentions are considered, the inferred search result quality will be further based, at least in part on determining/assessing the inferred user intentions of the queries.

As further shown, the disclosed processes also, optionally, include segmenting the queries into a plurality of different segmented groupings based on query type, the query type being based on the features and patterns of the queries, wherein each segmented grouping of the different segmented groupings corresponds to a different set of inferred intentions and actions to be performed for providing search results for queries of the query type of the corresponding segmented grouping.

To facilitate the generating of training data based on inferred intentions, the process of labelling the training data will include generating labels for relevance of actions corresponding to different corresponding query intention types.

This may include, for instance, generating labels for actions that includes at least two or more of: (a) correcting typos in a search query, (b) selecting a best fit search result, (c) selecting an exact match search result, (d) identifying all possible results meeting a predetermined relevance threshold, (e) identifying all possible results, or (f) ranking and sorting all possible results by relevance.

Finally, once the training data is generated, labelled and, optionally, filtered, the system applies the training data to the learn-to-rank type model (act 450) to train the learn-to-rank type model (or to otherwise modify the model) to improve search quality of search results provided by the learn-to-rank type model when new user queries are provided to the learn-to-rank type model that having features and patterns corresponding to the filtered and labelled training data. This may also include the model to perform different types of actions based on detected features and patterns of the queries that distinguish the query type associated with particular actions.

It will be appreciated that in some embodiments, the invention includes methods and processes performed by a system. Additionally, the invention also includes systems that are configured to implement such methods. For example, the disclosed invention includes a computing system configured for training a learn-to-rank type model to improve quality and ranking of search results generated by the learn-to-rank type model and to perform certain actions when generating the search result to improve relevance of the search results for corresponding queries. This system includes one or more processors and one or more storage devices having stored computer-executable instructions that are executable by the one or more processors for configuring the computing system to implement various processes.

The processes the system is configured to implement, include the computing system accessing the aforementioned client data (e.g., (a) user queries provided to a learn-to-rank type model, (b) search result content that is provided as search results to the user queries that are generated by the learn-to-rank type model and (c) user behavior data comprising user interactions with the search result content).

The system is also configured to extract features and patterns of the client data, to identify (a) features and patterns of the queries, (b) features and patterns of the search result content and (c) features and patterns of the user behavior data, as well as to infer search result quality of the search result content based on at the user behavior data.

The system is also configured to generate labelled training data for the learn-to-rank type model by labelling features and patterns of the search result content for correspondingly paired search query features and pattern with corresponding relevance scores based on the inferred search result quality and, additionally, by at least pairing or labelling actions associated with generating the search result content.

The system is further configured to generate filtered and labelled training data by filtering the labelled training data to reduce noise in the labelled training data that is caused by conflicting relevance scores for common features and patterns of the search result content, as well as to apply the filtered and labelled training data to the learn-to-rank type model to train the learn-to-rank type model to improve search quality of search results provided by the learn-to-rank type model when new user queries are provided to the learn-to-rank type model that having features and patterns corresponding to the filtered and labelled training data. The system is further configured to train the learn-to-rank type model to perform different actions for different types of queries to improve quality and relevance of the search results generated by the learn-to-rank type model for the new and different queries, all while refraining from storing or transmitting the client data outside of a client enclave and so as to protect confidentiality of the client data.

Various elements in FIG. 4 also reflect the broader usage of eyes-on-analysis for facilitating improvements in the end-to-end search quality and user experience. In particular, some embodiments further include generating dissatisfaction (DSAT) examples (460) from at least some of the queries that are provided. These DSAT examples, for instance may include situations in which no results were identified and or the user did not select on any of the results that were provided as search result content for the corresponding queries. In such circumstances, the system may log the queries and/or the specific query features and patterns to be reviewed by analysts/engineers with eyes-on-analysis to assess what types of issues need to be resolved or addressed to avoid the types of failures that are associated with the DSAT examples.

The DSAT examples, as well as resulting feedback and output from the DSAT example analysis can be applied (470) and used to improve different natural language understanding (NLU) functionality and ranking processes described herein. Such improvements can be made by human directed instructions for making modifications to the actions and/or processes performed by the NLU functions and ranking processes. Additionally, or alternatively, the improvements can be made automatically by providing the DSAT examples and/or analysis as training data used to train and/or modify the NLU and ranking models described and referenced herein.

Computer Configurations

Embodiments of the present invention may comprise or utilize a special purpose or general-purpose computer (e.g., computing system 110 and/or client system 120) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media (e.g., storage 140 and 124 of FIG. 1) that store computer-executable instructions (e.g., 118 of FIG. 1) are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media, which is distinct and distinguished from transmission computer-readable media, include physical and tangible hardware. Examples of physical computer-readable storage media include hardware storage devices such as RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer and which are distinguished from merely transitory carrier waves and other transitory media that are not configured as physical and tangible hardware.

A "network" (e.g., network 135 of FIG. 1) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include any network links and/or data links, including transitory carrier waves, which can be used to carry, or desired program code means in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. Additionally, it will be appreciated that the scope of the invention also includes combinations of the disclosed features that are not explicitly stated, but which are contemplated, and which can include any combination of the disclosed features.

The scope of the invention is, therefore, indicated by the appended claims rather than by the foregoing description. All changes which come within the meaning and range of equivalency of the claims are to be embraced within their scope.

What is claimed:

1. A method implemented by a computing system comprising a processor and a hardware storage device storing computer-executable instructions that are executable by the processor for causing the computing system to train a learn-to-rank type model to improve quality and ranking of search results generated by the learn-to-rank type model, the method comprising:

the computing system accessing client data, which includes a plurality of user queries;

the computing system extracting features and patterns of the client data while keeping values of the user queries private, wherein the extracted features and patterns of the client data include: a first pattern of types of grammar used in the plurality of user queries and a second pattern of formatting of terms used in the plurality of user queries;

the computing system inferring a search result quality of search result content based on user behavior data included in the client data, wherein the inferred search result quality is further based on analyzing click signals made by a user at a user system, and wherein the click signals are further used to determine at least one of:

a frequency of interacting with the search result content, whether the user navigated to another resource that is referenced in the search result content, whether the user copied or saved any of the content, which one or more search results the user interacted with the most out of the different search results in the search result content, or which search results the user did not interact with at all from the search result content;

the computing system generating labelled training data for a learn-to-rank type model by labelling features and patterns of the search result content with corresponding relevance scores based on the inferred search result quality;

the computing system identifying conflicting relevance scores for common features and patterns of the search result content included in the labelled training data;

the computing system generating filtered and labelled training data by filtering the labelled training data based on omitting or resolving the identified conflicting relevance scores to reduce noise in the labelled training data that is caused by conflicting relevance scores for common features and patterns of the search result content included in the labelled training data;

the computing system applying the filtered and labelled training data to the learn-to-rank type model to train the learn-to-rank type model to improve search quality of search results provided by the learn-to-rank type model when new user queries are provided to the learn-to-rank type model; and the computing system accessing analysis data that identifies analyst assessments of quality for the different search result content based on the plurality of user queries, wherein the analysis data includes labels and annotations associated with the values of the user queries.

2. The method of claim 1, wherein said extracting features and patterns of the client data is performed without storing or transmitting the client data outside of a client enclave and so as to protect confidentiality of the client data.

3. The method of claim 1, wherein extracting the features and the patterns of the client data is performed by accessing the analysis data, which identifies features and patterns of queries and the features and the patterns of the search result content.

4. The method of claim 3, wherein the inferred search result quality is further based at least in part on determining inferred user intentions of the queries and wherein the inferred user intentions are determined based on the analysis data that further identifies analyst assessments of the inferred user intentions based on the features and patterns of the queries.

5. The method of claim 4, wherein the method further includes segmenting the queries into a plurality of different segmented groupings based on query type, the query type being based on the features and patterns of the queries, each segmented grouping of the different segmented groupings corresponding to a different set of inferred intentions and actions to be performed for providing search results for queries of the query type of the corresponding segmented grouping.

6. The method of claim 5, wherein the method further includes: applying the filtered and labelled training data to the learn-to-rank type model to train the learn-to-rank type model to infer intention from a query and to distinguish between different intention types for new and different queries based on features and patterns of the new and different queries and to correspondingly perform different actions for the different types of inferred intentions of the new and different queries to improve quality and relevance of the search results generated by the learn-to-rank type model for the new and different queries.

7. The method of claim 6, wherein the labelling of the features and patterns of the search result content includes generating labels for relevance of actions corresponding to different query intention types.

8. The method of claim 7, wherein generating labels for actions corresponding to different query intention types includes generating labels for actions that includes at least two or more of: (a) correcting typos in a search query, (b) selecting a best fit search result, (c) selecting an exact match search result, (d) identifying all possible results meeting a predetermined relevance threshold, (e) identifying all possible results, or (f) ranking and sorting all possible results by relevance.

9. The method of claim 1, wherein omitting conflicting relevance scores further comprises:

deleting a newly assigned relevance score that is conflicting with an existing relevance score; or deleting an older assigned relevance score that is conflicting with a newer relevance score.

10. The method of claim 1, wherein resolving conflicting relevance scores further comprises:

averaging conflicting relevance scores for common features and patterns of search result content.

11. A computing system that trains a learn-to-rank type model to improve quality and ranking of search results generated by the learn-to-rank type model and to perform certain actions when generating the search results to improve relevance of the search results for corresponding queries, the computing system comprising:

one or more processors; and one or more storage devices that store instructions that are executable by the one or more processors to cause the computing system to:

access client data, which includes a plurality of user queries;

extract features and patterns of the client data while keeping values of the user queries private, wherein the extracted features and patterns of the client data include: a first pattern of types of grammar used in the plurality of user queries and a second pattern of formatting of terms used in the plurality of user queries;

infer a search result quality of search result content based on user behavior data included in the client data, wherein the inferred search result quality is further based on analyzing click signals made by a user at a user system, and wherein the click signals are further used to determine at least one of:

a frequency of interacting with the search result content, whether the user navigated to another resource that is referenced in the search result content, whether the user copied or saved any of the content, which one or more search results the user interacted with the most out of the different search results in the search result content, or which search results the user did not interact with at all from the search result content;

generate labelled training data for the learn-to-rank type model by labelling features and patterns of the search result content for correspondingly paired search query features and pattern with corresponding relevance scores based on the inferred search result quality and, additionally, by at least pairing or labelling actions associated with generating the search result content;

identify conflicting relevance scores for common features and patterns of the search result content included in the labelled training data;

generate filtered and labelled training data by filtering the labelled training data based on omitting or resolving the identified conflicting relevance scores to reduce noise in the labelled training data that is caused by conflicting relevance scores for common features and patterns of the search result content included in the labelled training data;

apply the filtered and labelled training data to the learn-to-rank type model to train the learn-to-rank type model to improve search quality of search results provided by the learn-to-rank type model when new user queries are provided to the learn-to-rank type model that have features and patterns corresponding to the filtered and labelled training data and to further train the learn-to-rank type model to perform different actions for different types of queries to improve quality and relevance of the search results generated by the learn-to-rank type model for the new and different queries; and access analysis data that identifies analyst assessments of quality for the different search result content based on the plurality of user queries, wherein the analysis data includes labels and annotations associated with the values of the user queries.

12. The computing system of claim 11, wherein said extracting features and patterns of the client data is performed without storing or transmitting the client data outside of a client enclave and so as to protect confidentiality of the client data.

13. The computing system of claim 11, the computer-executable instructions being further executable for further configuring the computing system to implement the following:

extracting features and patterns of the client data by at least accessing the analysis data, which identifies features and patterns of queries and the features and patterns of the search result content.

14. The computing system of claim 13, wherein the inferred search result quality is further based at least in part on determining inferred user intentions of the queries and wherein the inferred user intentions are determined based on the analysis data that further identifies analyst assessments of the inferred user intentions based on the features and patterns of the queries.

15. The computing system of claim 14, wherein the computer-executable instructions being further executable for further configuring the computing system to implement the following:

segmenting the queries into a plurality of different segmented groupings based on query type, the query type being based on the features and patterns of the queries, each segmented grouping of the different segmented groupings corresponding to a different set of inferred intentions and actions to be performed for providing search results for queries of the query type of the corresponding segmented grouping.

16. The computing system of claim 15, wherein the computer-executable instructions being further executable for further configuring the computing system to implement the following:

applying the filtered and labelled training data to the learn-to-rank type model to train the learn-to-rank type model to infer intention from a query and to distinguish between different intention types for new and different queries based on features and patterns of the new and different queries and to correspondingly perform different actions for the different types of inferred intentions of the new and different queries to improve quality and relevance of results generated by the learn-to-rank type model for the new and different queries.

17. The computing system of claim 16, wherein the labelling of the features and patterns of the search result content includes generating labels for relevance of actions corresponding to different query intention types.

18. The computing system of claim 17, wherein generating labels for actions corresponding to different query intention types includes generating labels for actions that includes at least two or more of: (a) correcting typos in a search query, (b) selecting a best fit search result, (c) selecting an exact match search result, (d) identifying all possible results meeting a predetermined relevance threshold, (e) identifying all possible results, or (f) ranking and sorting all possible results by relevance.

* * * * *